United States Patent
Amat Holgado et al.

(10) Patent No.: US 11,674,290 B2
(45) Date of Patent: Jun. 13, 2023

(54) LOCKING DEVICE FOR SECURING A WEAR ELEMENT IN A SUPPORT IN AN EARTH MOVING MACHINE

(71) Applicant: METALOGENIA RESEARCH & TECHNOLOGIES S.L., Barcelona (ES)

(72) Inventors: Carlos Amat Holgado, Premia de Dalt (ES); Albert Gimeno Tordera, Barcelona (ES); Jorge Triginer Boixeda, Barcelona (ES)

(73) Assignee: METALOGENIA RESEARCH & TECHNOLOGIES S.L., Barcelona (ES)

( * ) Notice: Subject to any disclaimer, the term of this patent is extended or adjusted under 35 U.S.C. 154(b) by 1298 days.

(21) Appl. No.: 16/078,922

(22) PCT Filed: Feb. 14, 2017

(86) PCT No.: PCT/EP2017/053239
§ 371 (c)(1),
(2) Date: Aug. 22, 2018

(87) PCT Pub. No.: WO2017/144305
PCT Pub. Date: Aug. 31, 2017

(65) Prior Publication Data
US 2019/0055717 A1    Feb. 21, 2019

(30) Foreign Application Priority Data
Feb. 23, 2016    (EP) .................................... 16382074

(51) Int. Cl.
*E02F 9/28* (2006.01)
*F16B 5/02* (2006.01)
(Continued)

(52) U.S. Cl.
CPC .......... *E02F 9/2833* (2013.01); *E02F 9/2841* (2013.01); *F16B 5/0275* (2013.01);
(Continued)

(58) Field of Classification Search
CPC .......... F16B 7/06; F16B 5/0275; F16B 35/02; F16B 21/12; F16B 35/005; E02F 9/2825; E02F 9/2833; E02F 9/2841
See application file for complete search history.

(56) References Cited

U.S. PATENT DOCUMENTS 4,974,986 A    12/1990    Cook
6,053,922 A *   4/2000    Krause ................ A61B 17/164
                                                  606/180

(Continued)

FOREIGN PATENT DOCUMENTS

EP    2952639 A1    12/2015
GB    1476822 A  *  6/1977    ............ E02F 9/2841
WO    2007016719 A1    2/2007

OTHER PUBLICATIONS

Internation Search Report, PCT/EP2017/053239, dated May 10, 2017.

*Primary Examiner* — Matthew R McMahon
(74) *Attorney, Agent, or Firm* — Porzio Bromberg & Newman P.C.

(57) ABSTRACT

A locking device for securing a wear element in a support in an earth moving machine includes a central shaft with a first right hand threaded segment and a second left hand threaded segment. Locking elements are screwed onto the threaded segments. Both threaded segments are attached to one another and are suitable for transmitting rotational movement between both threaded segments. A coupling of the threaded segments can comprise a disc with two faces, each of them opposite one end of the threaded segments. Between each of the faces and the end of the threaded segment there (Continued)

is a tongue and groove extending to a first diameter and a second diameter, respectively, such that the disc and the threaded segments are suitable for moving with respect to one another.

10 Claims, 7 Drawing Sheets

(51) Int. Cl.
  *F16B 21/12* (2006.01)
  *F16B 35/02* (2006.01)
  *F16B 7/06* (2006.01)
  *F16B 35/00* (2006.01)

(52) U.S. Cl.
  CPC .............. *F16B 21/12* (2013.01); *F16B 35/02* (2013.01); *F16B 7/06* (2013.01); *F16B 35/005* (2013.01)

(56) References Cited

U.S. PATENT DOCUMENTS

| | | | |
|---|---|---|---|
| 6,447,518 B1* | 9/2002 | Krause | F16C 1/02 606/80 |
| 8,387,290 B2* | 3/2013 | Campomanes | E02F 9/2841 37/456 |
| 9,009,995 B2* | 4/2015 | Freund | E02F 9/2825 37/456 |
| 9,482,260 B1* | 11/2016 | Krause | A61B 17/869 |
| 9,702,122 B2* | 7/2017 | Hurley | E02F 9/2833 |
| 10,161,113 B2* | 12/2018 | Tuto | E21C 35/193 |
| 10,314,631 B2* | 6/2019 | Gonzalez Blohm | A61B 17/70 |
| 2003/0140531 A1 | 7/2003 | Pippins | |
| 2011/0144703 A1* | 6/2011 | Krause | A61B 17/869 606/309 |
| 2014/0114312 A1* | 4/2014 | Krause | A61B 17/864 606/62 |
| 2015/0197922 A1 | 7/2015 | Freund | |

* cited by examiner

LOCKING DEVICE FOR SECURING A WEAR ELEMENT IN A SUPPORT IN AN EARTH MOVING MACHINE

FIELD OF THE INVENTION

The invention relates to a locking device for securing a wear part in a support (for example, an adapter) in an earth moving machine, the locking device comprising:

- a central shaft with a first right hand threaded segment and defining a first rotation axis and a second left hand threaded segment defining a second rotation axis,
- a first locking element screwed onto the first threaded segment and a second locking element screwed on the second threaded segment, and
- screwing means in at least one of the ends of the central shaft and accessible from the outside through at least one of the locking elements, where the first threaded segment and the second threaded segment are attached to one another by coupling means, where the coupling means are suitable for transmitting rotational movement between the first threaded segment and the second threaded segment.

State of the Art

Earth moving machines are used in excavation, demolition, construction, mining, and dredging works and in similar activities. They generally have a shovel or bucket in which the material is collected. The shovel or bucket is subjected to intense stresses and to enormous erosion, especially in the area of the lip (also referred to as blade). As a result, the shovel or bucket usually has a plurality of wear elements protecting it from wear and impacts and/or improving penetration into the ground, such as for example teeth, supports or toothbars (also referred to as adapters) and/or (front and side) protectors.

All these wear or protective elements, and particularly the teeth, are subjected to intense mechanical stress, plastic deformations and enormous wear. For this reason it is common to have to replace them every so often when the wear sustained requires it. Furthermore, these machines can work in a wide range of applications in which it may be necessary to change the design of the teeth to improve bucket performance.

The wear elements can be attached to other wear elements (such as a tooth attached to an adapter) and/or can be attached to the lip or blade of the bucket or shovel (such as an adapter attached to a lip).

The wear or protective elements can be fixed mechanically (which is easier and faster to change) or welded (which are less expensive but hard to change and with the risk of damaging the blade with the weld), depending on the degree of abrasiveness of the ground and on the machine dimensions. It must also be taken into account that large earth moving machines, particularly those working in quarries and mines, are essential for production at said sites. As a result, the times of inactivity of these machines can very significantly affect the productivity thereof and it is of enormous interest that the wear elements can be changed in a fast and secure manner in the field, without having to take the machine or bucket to a workshop to use special equipment. As a result, it is usually advantageous for the wear elements to be fixed in a mechanical manner and, to that end, to use a locking device, for example, a pin.

The wear element usually has a cavity in which there is housed a nose arranged in the support (for example, the adapter) on which the wear element will be mounted. A through hole goes through the nose and walls of the cavity, such that in a mounted position, the locking device (which is substantially an elongated pin) can be introduced through the through hole and the wear element thus be locked in the mounted position. In some cases it is the wear element that has a nose and the support that has a cavity in which the nose is housed in the mounted position, but otherwise what remains of the concept works in a similar manner.

The locking elements indicated above are known. Patent document WO 2007/016719 A1 discloses one of them. It has a central shaft with a first threaded segment in a given direction and a second threaded segment in the opposite direction. Therefore, when the central shaft is rotated in a specific direction, two parts, each of which is mounted on one of the threaded segments, move away from or closer to one another. Patent document US 2015/197922 A1 discloses a wear assembly for attachment to a digging device, that comprises a wear member and a lock. The lock is adjustable between an extended configuration and a retracted configuration, and comprises at least one locking element that projects outwardly from its mounting in the extended configuration of the lock and is operative to be displaced inwardly from the extended configuration towards its mounting to adopt the retracted configuration of the lock. When the wear member is assembled to the digging device, movement of the locking element from the extended configuration towards the retracted configuration causes the wear member to be locked to the digging device in the assembled condition.

However, in some cases it has been found that the mounting and/or the dismounting of such locking devices is problematic as the parts mounted on the central shaft cannot be satisfactorily screwed and/or unscrewed.

DESCRIPTION OF THE INVENTION

The object of the invention is to overcome these drawbacks. This object is achieved by means of a locking device of the type indicated above, characterized in that the coupling means comprise a disc with a rotation axis and with a first face opposite one end of the first threaded segment and a second face opposite one end of the second threaded segment, where between the first face and the end of the first threaded segment there is a first tongue and groove extending according to a first diameter, such that the disc and the first threaded segment are suitable for moving with respect to one another according to the first diameter, and between the second face and the end of the second threaded segment there is a second tongue and groove extending according to a second diameter, such that the disc and the second threaded segment are suitable for moving with respect to one another according to the second diameter.

Indeed, it is not uncommon, particularly after use of the machine and due to stresses, wear and plastic deformations the wear element sustains, for it to be problematic to remove the wear element, particularly for it to be problematic to remove the locking device keeping the wear element mounted on its support. One of the reasons is that to that end it is necessary to screw the locking elements onto the central shaft again, such that they are withdrawn in order to thus be able to release the wear element from its support. However, during use of the machine the central shaft may have sustained deformations due to which the first rotation axis of the first threaded segment and the second rotation axis of the second threaded segment no longer match up (either due to shift between them (they are parallel but do not match up), or because they form a non-zero angle between one another (they are no longer aligned), or both at the same time). Furthermore, the thread itself of the threading may have sustained deformations rendering it useless. With the solution according to the invention, the coupling means absorb these movements such that the thread sustains fewer deformations, and furthermore it is still possible to rotate the assembly formed by the first threaded segment and the second threaded segment because the coupling means are suitable for transmitting the rotational movement of one threaded segment to the other even though their respective axis no longer match up.

In general, it is advantageous that the coupling means are suitable for transmitting rotational movement between the first threaded segment and the second threaded segment when the first rotation axis and the second rotation axis are misaligned and/or when the first rotation axis and the second rotation axis are not parallel. As previously mentioned, both deformations can take place, so it is advantageous for the coupling means to be able to work in these cases.

The simple geometry of the present invention corrects some of the deformations, particularly when the rotation axes are parallel but do not match up. Preferably, the first diameter and the second diameter are perpendicular to one another. However, if the first diameter and the second diameter are parallel to one another, a part resulting from a more cost-effective manufacture and which has been sufficiently effective in a plurality of cases is obtained.

Preferably, the first tongue and groove and/or the second tongue and groove includes a projection and a channel, where the cross section, according to the first diameter and/or the second diameter, respectively, of the projection, is smaller than the cross section of the channel. Indeed, this smaller cross section, which is smaller than that which would require a simple adjustment of both portions of the tongue and groove, allows absorbing deformations that involve the first rotation axis and the second rotation axis forming an angle with respect to one another. Although this alternative does not allow correcting cases in which the angle between both rotation axis is very large, in practice it is enough for correcting the most common cases. Generally, in the coupling means design step, the required minimum tolerance that there must be between the different surfaces opposite one another in the tongue and groove is estimated by means of DIN standard 7168. Preferably, the clearance existing between each pair of surfaces opposite one another in any of the tongues and grooves is greater by at least 15%, preferably greater by at least 20%, than the required minimum tolerance calculated according to DIN standard 7168 (the percentages are measured with respect to the required minimum tolerance). Alternatively, or additionally, it is advantageous for the first tongue and groove and/or the second tongue and groove to include a projection and a channel, where the cross section, according to the first diameter and/or the second diameter, respectively, of said projection has chamfers. Indeed, these chamfers also allow compensating for deformations of this type.

In any of the preceding cases, there is an additional advantage that these deformations are absorbed by the coupling means without the threaded segments being subjected to stresses, so damage thereto is prevented.

Preferably, the first tongue and groove and/or the second tongue and groove includes a projection the cross section of which, according to the first diameter and/or the second diameter, respectively, is wider at its free end than at its base, and a channel the cross section of which is wider at its base than at its open end. Therefore, once the central shaft assembly is mounted, which assembly is formed by the first threaded segment, the second threaded segment and the coupling means, a unit is formed that is not dismounted in the axial direction, which makes transport and mounting thereof easier. In this sense, it is particularly advantageous for the first tongue and groove and/or the second tongue and groove to include a projection the cross section of which, according to the first diameter and/or the second diameter, respectively, has a T shape, and a channel the cross section of which has the corresponding inverted T shape.

Advantageously, the locking device comprises a casing inside which there are housed the central shaft, and at least partially, the first locking element and the second locking element. Preferably, the disc has a non-smooth side surface and the casing comprises a retaining screw the free end of which is suitable for coming into contact with said non-smooth side surface, thereby preventing the disc from rotating in the event of external vibrations.

Advantageously, between the coupling means and each of the threaded segments there is a joint made from an elastic polymer material with multiple closed, gas filled internal cavities, such as the material sold by BASF under the name Cellasto®, for example. The coupling means are thereby protected from dust and fines at the work site and the grease added to the coupling means is thereby retained. The gas-filled cavities are compressed when subjected to pressure, reducing their volume, but presenting nil or minimal transverse expansions.

BRIEF DESCRIPTION OF THE DRAWINGS

Other advantages and features of the invention can be seen from the following description in which preferred embodiments of the invention are described in a non-limiting manner in reference to the attached drawings. In said drawings.

DETAILED DESCRIPTION OF EMBODIMENTS OF THE INVENTION

Figure 1:
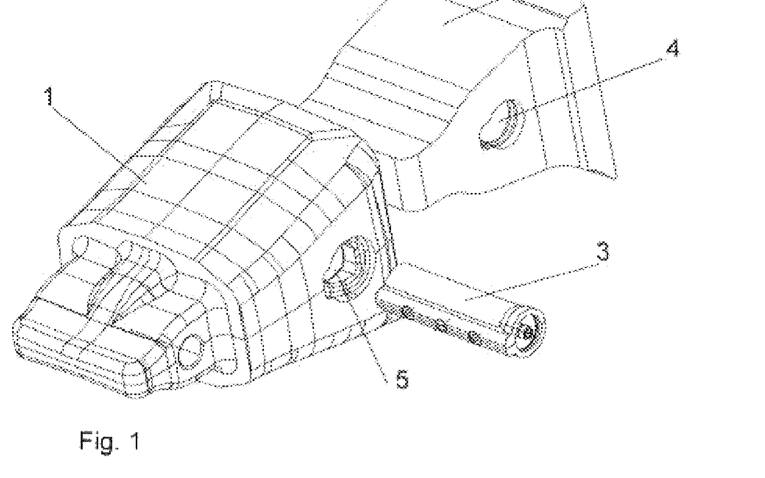
FIG. 1 shows a perspective view of a wear element, its support and a locking device according to the invention.
Figure 2:
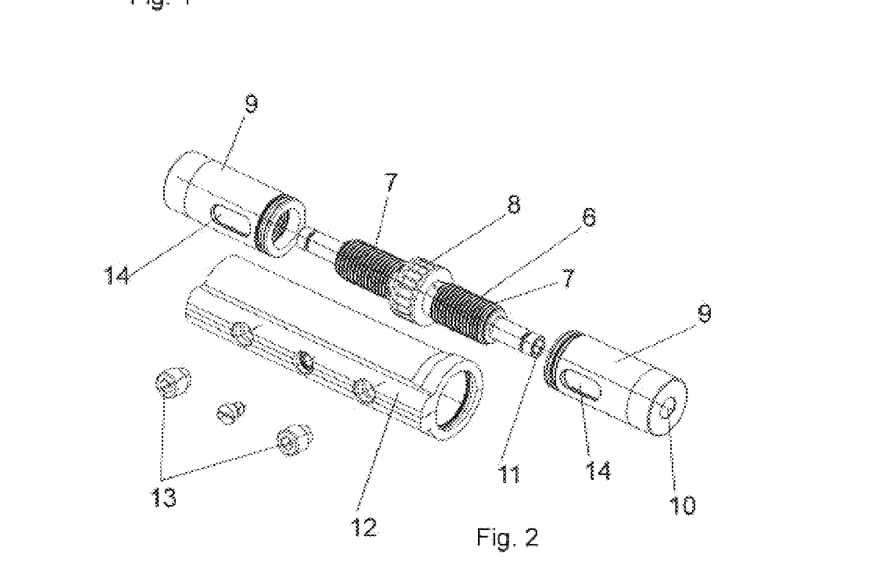
FIG. 2 shows an exploded perspective view of a locking device according to the invention.

FIG. 1 shows an exploded perspective view of a wear element 1, a support 2 for the wear element 1 and a locking device 3. The support 2 has a through hole 4 in its nose and the wear element 1 also has side holes 5 on the sides of the cavity in which the nose will be housed, such that in the mounted position, the through hole 4 and the side holes 5 are at least partially aligned. The locking device 3 (see FIG. 2) comprises a central shaft 6 formed by a first threaded segment 7, a second threaded segment 7 and coupling means 8 joining both threaded segments. The threads of both threaded segments 7 have different rotation directions, i.e., one is a right hand thread while the other one is a left hand thread. There is a locking element 9 on each threaded segment 7. Each locking element 9 has an end hole 10 through which the end of the central shaft 6 is accessible. At the end of the central shaft 6 there are screwing means 11 (for example, a hexagonal hole or a hexagonal head) such that an operator can introduce the corresponding key through the end hole 10 and rotate the central shaft 6. The assembly of the central shaft 6 with the threaded segments 7 is housed inside a casing 12. The casing 12 has two guide screws 13 which are housed inside two guides 14 in the locking elements 9. The guide screws 13 and the guides 14 perform two functions: on one hand they prevent the relative rotation between the casing 12 and the locking elements 9 and, on the other hand, prevent the locking elements 9 from being able to completely come out of the casing 12 or corresponding threaded segment 7. The locking device 3 is housed inside the through hole 4, and once the wear element 1 is positioned on the nose of the support 2, access to the central shaft 6 is obtained by means of the corresponding tool and the two locking elements 9 are simultaneously unscrewed (as a result of the system with two threads in opposite directions). The two locking elements 9 therefore project from the casing 12 until being housed inside the side holes 5, at which time the wear element 1 is retained in the mounted position. As can be seen, neither the outer geometry of the casing 12 nor the inner geometry of the through hole 4 are circular cylinders. Relative rotation between the locking device 3 and the support 2 is thereby prevented.

As can be seen, the invention is independent of the fact that the wear element is a given wear element (a tooth, an adapter, etc.). The wear element can be any element provided that it is fixed to the corresponding support through a locking device according to the invention.

Figures 3, 4, 5:
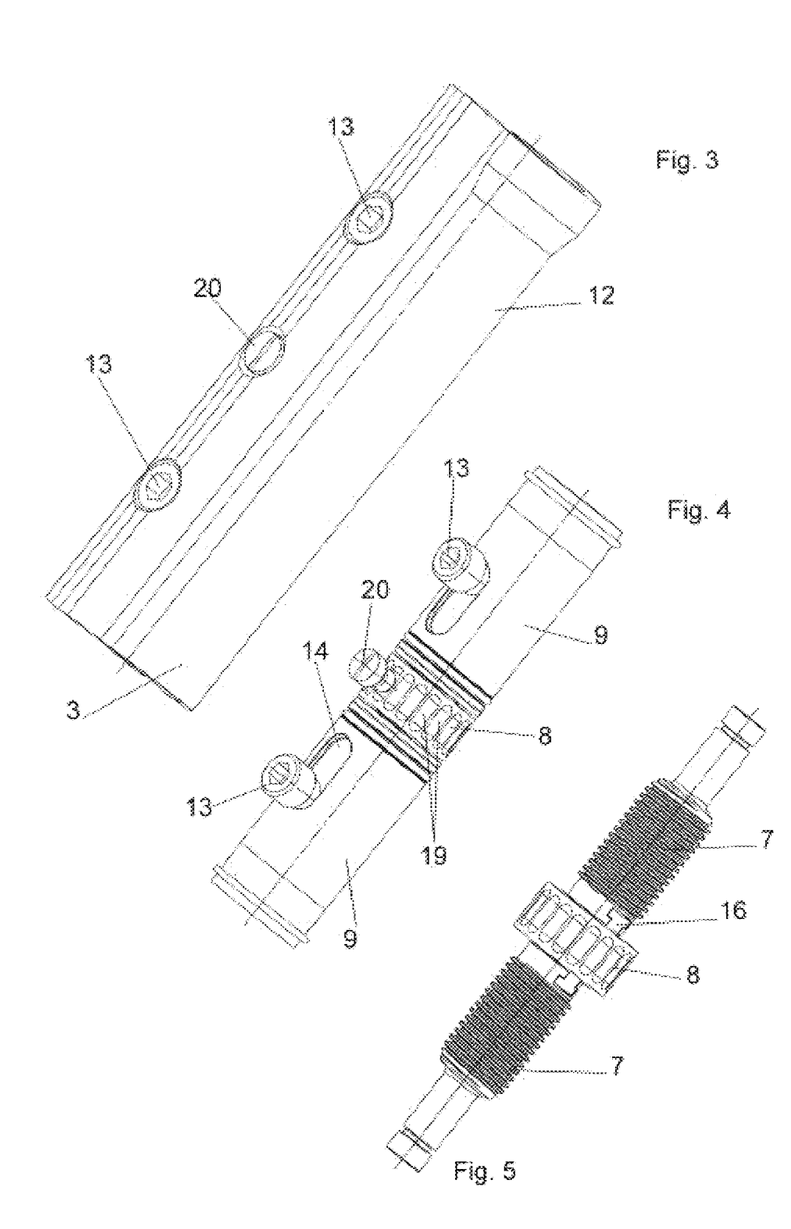
FIG. 3 shows a perspective view of a locking device according to the invention.
FIG. 4 shows a perspective view of the locking device of FIG. 3 without the casing.
FIG. 5 shows a perspective view of the central shaft of the locking device of FIG. 3.

FIG. 3 shows a locking device 3 with the locking elements 9 completely withdrawn, so only the casing 12 and the guide screws 13 are seen. FIG. 4 shows the locking device 3 of FIG. 3 but without the casing 12, while FIG. 5 shows the central shaft 6 with the two threaded segments 7 and the coupling means 8.

Figure 13:
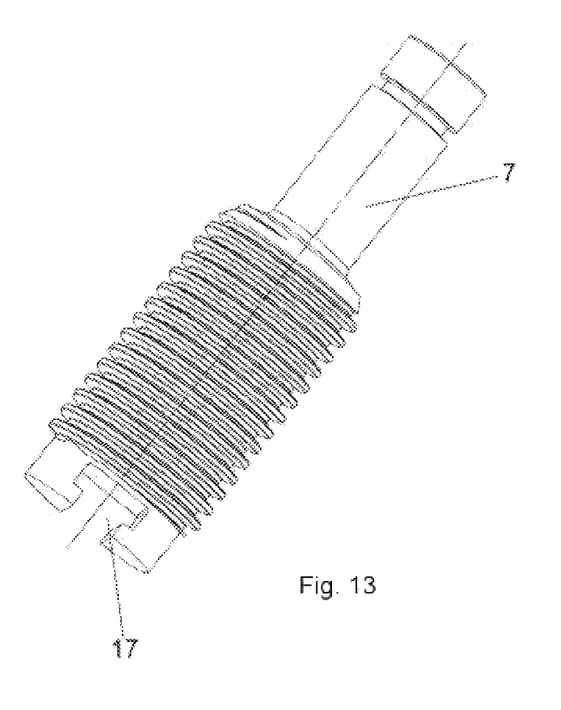
FIG. 13 shows a perspective view of a threaded segment of the central shaft of FIG. 5.

FIGS. 6 to 11 show coupling means 8 according to the invention comprising a disc 15 with a rotation axis. On each of the faces of the disc 15 there is an elongated projection 16 with a substantially T-shaped cross section. This projection 16 is suitable for being housed in a channel 17, arranged at the end of the threaded segment 7 (see FIG. 13) and with an inverted T-shaped cross section. Additionally, the side surface 18 of the disc 15 is not smooth, but rather comprises a plurality of grooves 19 extending axially and uniformly distributed in a circumferential direction around the side surface 18. These grooves 19, together with a retaining screw 20 arranged in the casing 12, act as retaining means that prevent the coupling means 8 from rotating in the event of vibrations.

Figure 6:
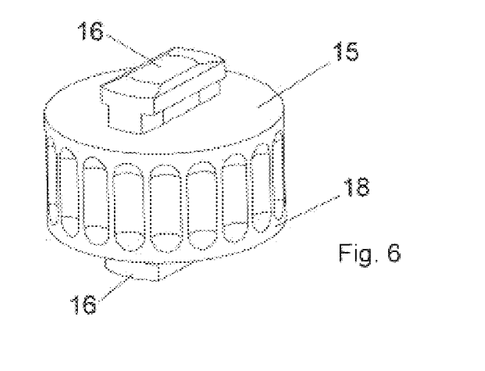
FIG. 6 shows a perspective view of the coupling means included in the central shaft of FIG. 5.
Figure 7:
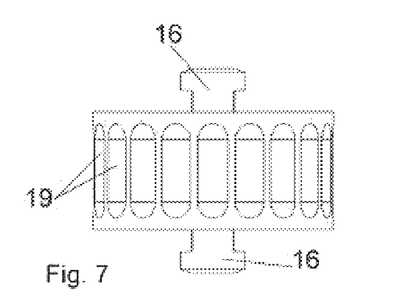
FIGS. 7 to 9 show front elevational, side elevational and top plan views, respectively, of the coupling means of FIG. 6.
Figure 8:
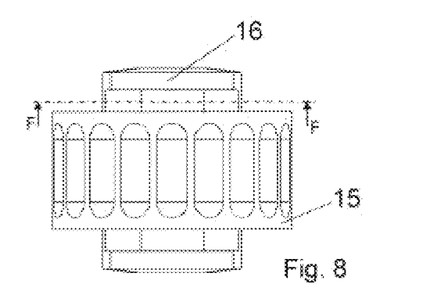
Figure 9:
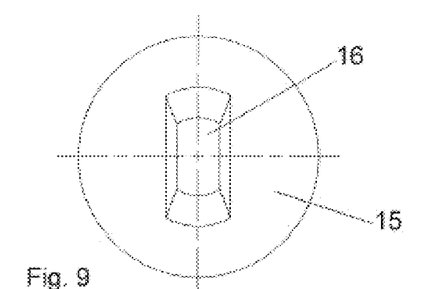
Figure 10:
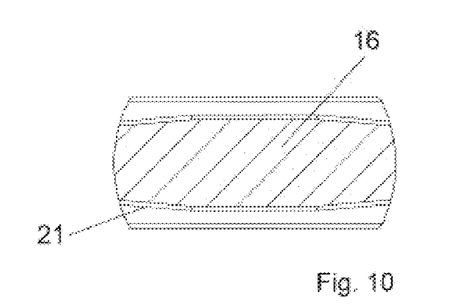
FIG. 10 shows a view of a section according to line F-F of FIG. 8.
Figure 11:
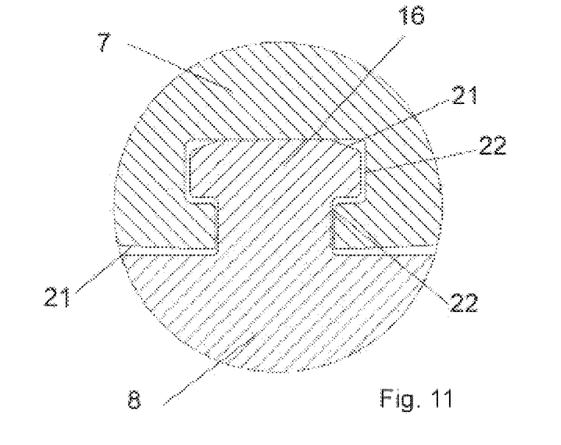
FIG. 11 shows a cross-section view of the tongue and groove of the coupling means of FIG. 6.

The surfaces of the projection 16 have a plurality of chamfers 21 or inclined planes that are not present in the channel 17 (which preferably has a constant cross section). These chamfers 21 or inclined planes thereby generate gaps that allow a certain relative movement between the projection 16 and the channel 17. Certain deformations in the central shaft 6 can thereby be absorbed without the coupling means 8 stop performing their main function (transmitting rotational movement from one threaded segment 7 to the other) as a result. Particularly, as regards the chamfer present on the upper surface of the head of the T, it must be taken into account that depending on the geometry and the materials used, there is a relative maximum angle of rotation between a threaded segment 7 and the disc 15 before the material enters the plastic deformation area. Preferably, the chamfer of the upper surface of the head of the T has an angle that is greater than or equal to said relative maximum angle of rotation.

Likewise, between the surfaces of the projection 16 and the corresponding surfaces of the channel 17, in those segments in which they are parallel, there is a clearance 22 greater than that which is strictly required to allow the mounting of the projection 16 in the channel 17 and greater than that which is strictly required resulting from the manufacturing technology. In other words, the assembly is designed such that it has "excessive clearance". This "excessive clearance" is what will allow relative movement between the coupling means 8 and the threaded segments 7 which absorbs deformations that there may be in the central shaft 6 while the machine works. As previously indicated, these clearances 22 existing between each pair of surfaces opposite one another in any of the tongues and grooves are preferably greater by at least 15%, preferably greater by at least 20%, than the required minimum tolerance calculated according to DIN standard 7168 (the percentages are measured with respect to the required minimum tolerance). In the specific case in which the tongue and groove has a projection 16 with a T-shaped cross section, this criterion "of minimums" (that clearance 22 is greater by at least 15%, preferably greater by at least 20%, than the required minimum tolerance calculated according to DIN standard 7168) is preferably met in the "neck" of the tongue and groove, i.e., between the vertical wall (according to FIG. 11) of the T and the vertical wall of the channel 17. Advantageously, the other clearances existing between the head of the T and the walls of the channel 17 surrounding it are at least 50% greater (and preferably twice that) than the clearance 22 in the neck. It is also advantageous in the case of a T-shaped projection 16 for the width of the neck of the T to be ⅔ the width of the head of the T (both measured according to the cross section of FIG. 11). It is also advantageous for the height of the neck of the T to be equal to the height of the head of the T (both measured according to the cross section of FIG. 11).

Figure 12:
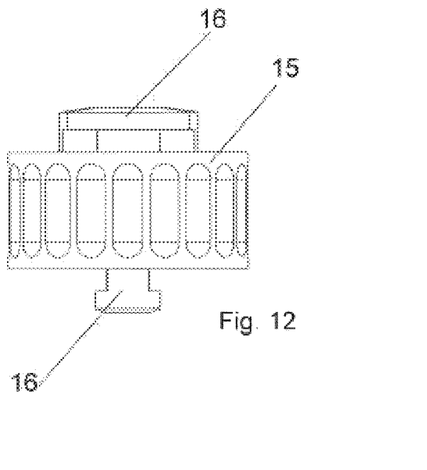
FIG. 12 shows a front elevational view of a second embodiment of coupling means according to the invention.

FIG. 12 shows coupling means 8 similar to those of FIGS. 6 to 11, but in which the projection 16 on the upper face (according to FIG. 12) of the disc 15 extends according to a diameter that is rotated 90° with respect to the diameter according to which the projection 16 extends on the lower face of the disc 15.

Figure 14:
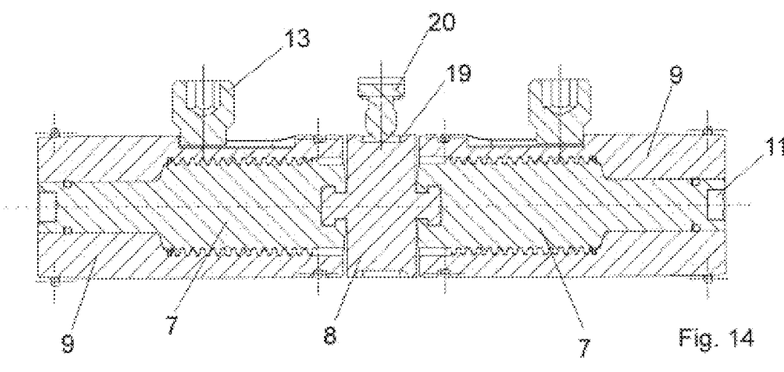
FIG. 14 shows a view of a longitudinal section of the locking device of FIG. 4, with the locking elements withdrawn.
Figure 15:
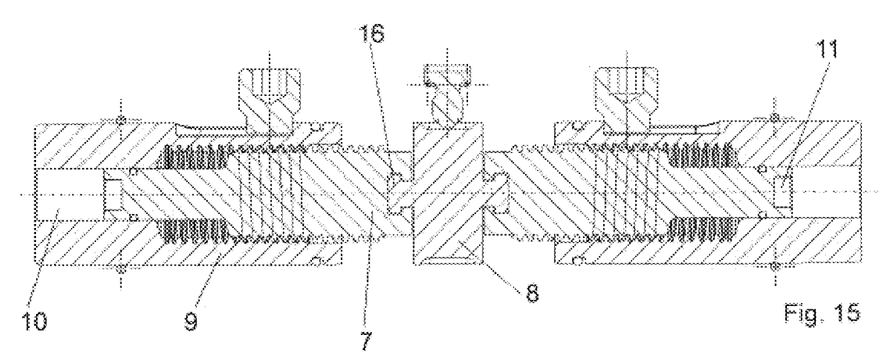
FIG. 15 shows a view of a longitudinal section of the locking device of FIG. 4, with the locking elements extended.

FIGS. 14 and 15 show a view of a longitudinal section of the locking device 3 of FIG. 4. The complete locking device 3 includes a casing 12, but the casing 12 has been removed for greater clarity in these drawings. In FIG. 14, the locking elements 9 are withdrawn. From this position, the operator can access the central shaft 6 by any of its two ends and rotate it with a suitable tool. The rotation applied to the threaded segment 7 on one hand moves the corresponding locking element 9 outwardly, and on the other hand rotates the coupling means 8 integrally and takes with it the other threaded segment 7, which in turn causes the outward movement of the other locking element 9, until reaching the position shown in FIG. 15. In an "ideal position", the first rotation axis of the first threaded segment 7 and the second rotation axis of the second threaded segment 7 entirely match up with one another and with the rotation axis of the disc 15 of the coupling means 8. However, the locking device 3 according to the present invention continues to work satisfactorily under "normal working conditions" in which the first rotation axis no longer completely matches up with the second rotation axis because the coupling means 8 allow, on one hand, absorbing these deviations, thereby protecting the threads, and on the other hand, transmitting rotational movement from one threaded segment 7 to the other despite deformations sustained.

Figure 16:
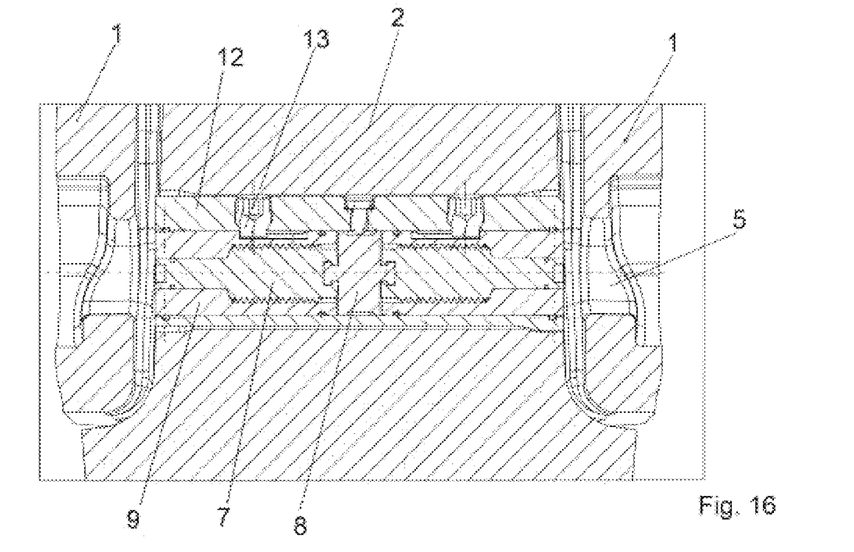
FIG. 16 shows a view of a longitudinal section of the locking device of FIG. 3, and partially, of the wear element and the support of FIG. 1, in the mounted position but with the locking elements withdrawn.
Figure 17:
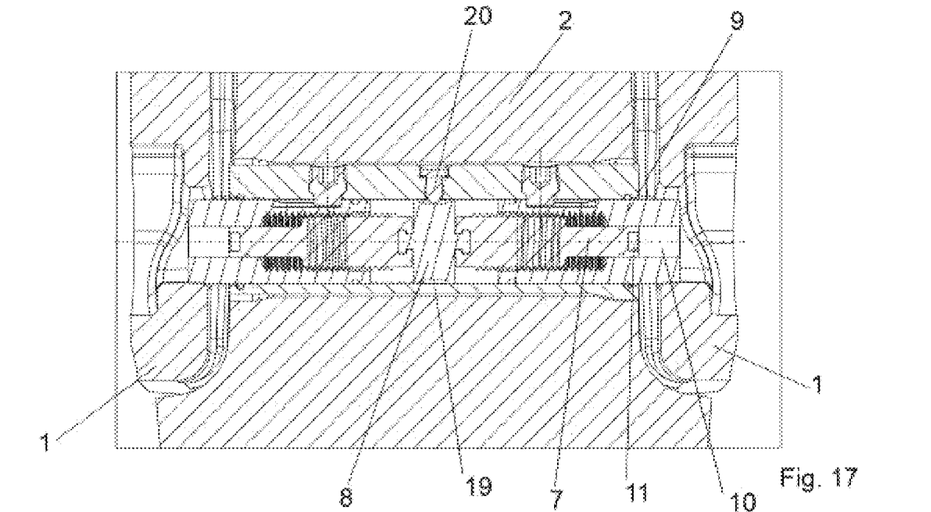
FIG. 17 shows a view of a longitudinal section of the locking device of FIG. 3, and partially, of the wear element and the support of FIG. 1, in the mounted position and with the locking elements extended.

FIGS. 16 and 17 are equivalent to FIGS. 14 and 15, but a cross section of the entire assembly of the locking device 3 (with the casing 12 included) has been depicted, and furthermore, the wear element 1 and the support 2 of FIG. 1 have partially been depicted. The stresses to which the locking device is subjected can be seen more clearly in these drawings. During use, the wear element 1 tends to move forward (upward in FIGS. 16 and 17), taking with it the ends of the locking elements 9. Accordingly, the central portion of the locking device 3 is compressed against the front wall of the through hole 4, forcing it to work under bending stresses. These stresses can lead to the deformations indicated above, as well as to the deterioration of the threads of the two threaded segments 7.

The invention claimed is:

1. A locking device for securing a wear element in a support in an earth moving machine, comprising:
    a central shaft with a first right hand threaded segment and defining a first rotation axis and a second left hand threaded segment defining a second rotation axis,
    a first locking element screwed onto said first threaded segment and a second locking element screwed on said second threaded segment,
    screwing means in at least one of the ends of said central shaft and accessible from the outside through at least one of said locking elements,
where said first threaded segment and said second threaded segment are attached to one another by coupling means, where said coupling means are suitable for transmitting rotational movement between said first threaded segment and said second threaded segment,
wherein said coupling means comprise a disc with a rotation axis and with a first face opposite one end of said first threaded segment and a second face opposite one end of said second threaded segment, where between said first face and the end of the first threaded segment there is a first tongue and groove extending according to a first diameter, such that said disc and said first threaded segment are suitable for moving with respect to one another according to said first diameter, and between said second face and the end of the second threaded segment there is a second tongue and groove extending according to a second diameter, such that said disc and said second threaded segment are suitable for moving with respect to one another according to said second diameter.

2. The locking device according to claim 1, wherein said first diameter and said second diameter are parallel to one another.

3. The locking device according to claim 1, wherein said first tongue and groove and/or said second tongue and groove includes a projection and a channel, where the cross section, according to said first diameter and/or said second diameter, respectively, of said projection is smaller than the cross section of said channel.

4. The locking device according to claim 1, wherein said first tongue and groove and/or said second tongue and groove includes a projection and a channel, where the cross section, according to said first diameter and/or said second diameter, respectively, of said projection has chamfers.

5. The locking device according to claim 4, where depending on the geometry of said first tongue and groove and/or second tongue and groove there is a relative maximum angle of rotation between said threaded segment and said disc before the material enters the plastic deformation area, characterized in that those of said chamfers arranged in the same rotational direction as said relative maximum angle of rotation have an angle that is greater than or equal to said relative maximum angle of rotation.

6. The locking device according to claim 1, wherein said first tongue and groove and/or said second tongue and groove includes a projection the cross section of which, according to said first diameter and/or said second diameter, respectively, is wider at its free end than at its base, and a channel the cross section of which is wider at its base than at its open end.

7. The locking device according to claim 1, wherein said first tongue and groove and/or said second tongue and groove includes a projection the cross section of which, according to said first diameter and/or said second diameter, respectively, has a T shape, and a channel the cross section of which has a corresponding inverted T shape.

8. The locking device according to claim 1, wherein between each pair of surfaces opposite one another in said first tongue and groove and/or second tongue and groove there is a clearance which is greater by at least 15% than the required minimum tolerance calculated according to DIN standard 7168.

9. The locking device according to claim 1, wherein it comprises a casing inside which there are housed said central shaft, and at least partially, said first locking element and second locking element.

10. The locking device according to claim 9, characterized in that said disc has a non-smooth side surface and said casing comprises a retaining screw the free end of which is suitable for coming into contact with said non-smooth side surface.

* * * * *